(12) United States Patent
Ueda et al.

(10) Patent No.: US 6,744,012 B2
(45) Date of Patent: Jun. 1, 2004

(54) CONTROL METHOD OF ARC WELDING AND ARC WELDER

(75) Inventors: Koji Ueda, Wako (JP); Manabu Murakami, Wako (JP); Akira Yanagita, Wako (JP); Takeshi Yamagami, Wako (JP); Katsuya Kugai, Osaka (JP); Yusuke Niimura, Osaka (JP); Akinobu Izawa, Osaka (JP); Rintaro Chinen, Osaka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/149,445

(22) PCT Filed: Dec. 4, 2001

(86) PCT No.: PCT/JP01/10575
§ 371 (c)(1),
(2), (4) Date: Jun. 27, 2002

(87) PCT Pub. No.: WO02/45899
PCT Pub. Date: Jun. 13, 2002

(65) Prior Publication Data
US 2003/0000931 A1 Jan. 2, 2003

(30) Foreign Application Priority Data
Dec. 7, 2000 (JP) .................................. 2000-373141

(51) Int. Cl.⁷ .............................................. B23K 9/095
(52) U.S. Cl. ......................... 219/130.21; 219/124.02
(58) Field of Search ...................... 219/124.02, 124.03, 219/124.34, 130.01, 130.21, 137.7, 137.71

(56) References Cited

U.S. PATENT DOCUMENTS

| 3,209,121 A | * | 9/1965 | Manz ........................ 219/137.7 |
| 3,262,006 A | * | 7/1966 | Sciaky et al. ........... 219/124.03 |
| 3,602,687 A | * | 8/1971 | Pollock ................... 219/124.02 |
| 4,093,844 A | * | 6/1978 | Fellure et al. .......... 219/124.02 |

FOREIGN PATENT DOCUMENTS

| JP | 26-12339 | 11/1951 |
| JP | 60-136876 | 9/1985 |
| JP | 7-148576 | 6/1995 |
| JP | 10-249526 | 9/1998 |

* cited by examiner

Primary Examiner—Clifford C. Shaw
(74) Attorney, Agent, or Firm—Arent Fox PLLC (57) ABSTRACT

A control method for arc welding wherein position control of an electrode or a torch is performed while adjusting welding conditions on the basis of optical information obtained from arc light generated during an arc welding process. Illuminance, which forms the optical information obtained from the arc light, has a certain mutual relationship with the arc length or the torch height, so that the weld control is accomplished based on the illuminance. The control method includes a step of comparing illuminance with reference information based on the mutual relationship, and a step of adjusting the welding conditions on the basis of a result of comparison.

6 Claims, 9 Drawing Sheets

CONTROL METHOD OF ARC WELDING AND ARC WELDER

TECHNICAL FIELD

This invention relates to an effective technique for automating an arc welding apparatus.

BACKGROUND ART

With the progress of automation of welding apparatuses, various techniques have been proposed, as disclosed in Japanese Patent Laid-Open Publications Nos. HEI-7-148576 entitled "Non-Consumable Electrode Automated Arc Welding Process" and HEI-10-249526 entitled "TIG Welding Apparatus for Rotating Body".

The automated arc welding process of Japanese Patent Laid-Open Publication No. HEI-7-148576 shows a distance measuring method during welding process in which a welding torch driven under constant arc length control or constant voltage control is provided with a laser sensor for measuring the distance from a base metal.

As is well known, an electric arc formed across the electrode and the base metal emits very bright light, which may cause an operation error of the laser sensor. To deal with this problem, in the aforementioned automated arc welding process sensing of the base metal by the laser sensor is performed at a position remote from the electrode. However, since the distance between a tip end of the electrode and a weld metal (molten pool) is important for welding, such a control, which is based on the distance between the electrode and the base metal, hardly achieves desired control accuracy. An attempt to bring the laser sensor close to the electrode for increasing the control accuracy will result in an operation error of the laser sensor because light from the electric arc (hereinafter referred to for brevity as "arc light") projects in the sensing field of the laser sensor. Thus, the foregoing automated arc welding process still has a problem of insufficient welding control accuracy.

The welding apparatus disclosed in Japanese Patent Laid-open Publication No. HEI-10-249526 includes a slit light source and a television camera. The slit light source illuminates a bevel or groove, and an image of the groove is picked up by the television camera and in turn is subjected to image processing so that control in a direction of the width of the groove is performed according to a result of the image processing. The vertical axis of the welding apparatus is controlled in a direction of the depth of the groove on the basis of weld voltage. Due to the arc light and weld spatters having high illumination intensities, which are present in the field of the television camera together with the groove illuminated with the slit light source, a special technique is required to selectively take up an image of the groove alone. This requirement increases cost of the welding apparatus. Furthermore, height control of the electrode achieved in reliance on the control of the arc voltage gives rise to a problem, as discussed below.

The arc voltage control relies on a physical phenomenon in which the length of an electric arc (hereinafter referred to for brevity as "arc length") is nearly in proportion to the voltage between the electrode and the base metal (hereinafter referred to for brevity as "electrode to base metal voltage"). In the arc voltage control, the electrode to base metal voltage is measured to estimate an arc length based on a measured value, and vertical movement of the electrode is controlled so that the estimated arc length is in equal to a desired value.

However, an experiment made by the present inventors have proved that under a certain condition, the arc voltage control is difficult to achieve regardless of whether the arc is a pulsed arc or a continuous arc.

Figure 8A:
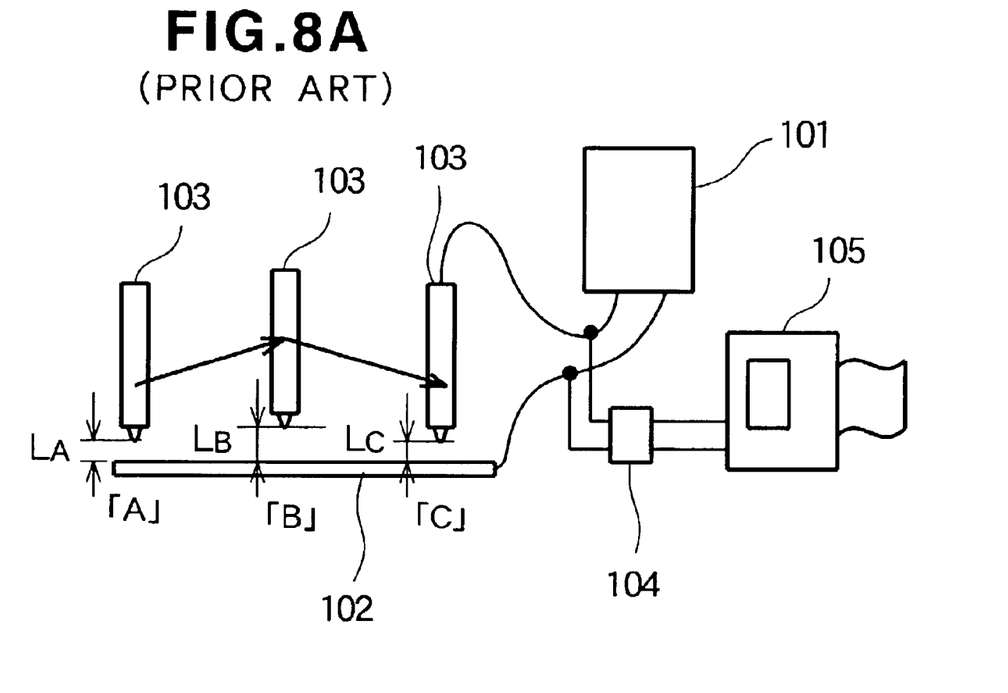
FIGS. 8A and 8B, respectively, are a view showing an experimental apparatus used for achieving a conventional voltage control using a pulsed arc, and a graph showing the result of experiment.
Figure 8B:
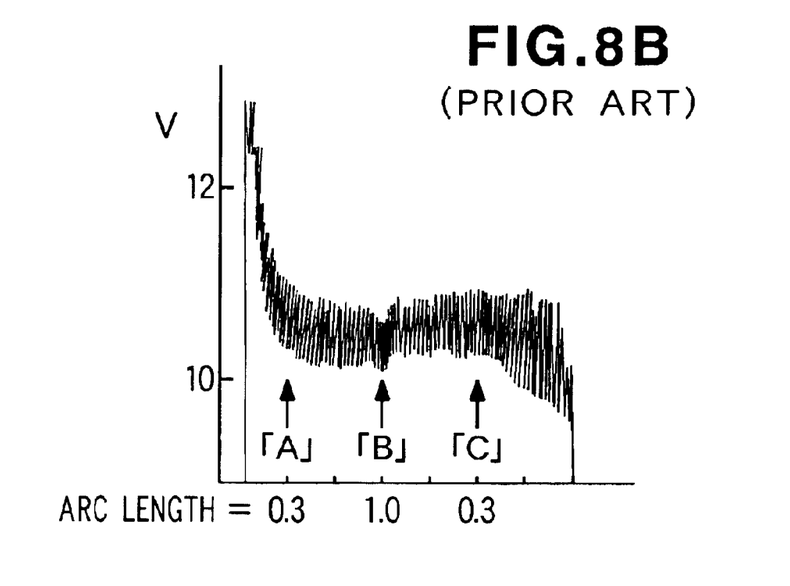

FIGS. 8A and 8B, respectively, show an experimental apparatus used for carrying out the conventional pulsed arc voltage control, and a graph showing the experimental result obtained using the experimental apparatus.

The experimental apparatus shown in FIG. 8A was arranged such that a welding source 101 produces an electric arc between a base metal 102 and an electrode 103 and, at the same time, a recorder 105 via a filter 104 records the arc voltage. Welding conditions utilized a reference current set to 4 A, a peak current set to 20 A, a pulse frequency set to 2 Hz, and a duty cycle set to 40%.

For purposes of illustration, the electrode 103 is shown as taking three different operation modes designated by reference characters "A", "B" and "C", respectively. The number of the electrode 103 used was only one. From "A" point to "B" point, welding was carried out by moving a torch (not shown) rightward in FIG. 8A over a distance of about 20 mm while moving the torch upward at a constant speed such that the arc length LA at "A" point is 0.3 mm and the arc length at "B" point is 1.0 mm. From "B" point to "C" point, the welding further continued by moving the torch rightward over a distance of about 20 mm while moving the torch downward at the constant speed so that the arc length LC at "C" point is 0.3 mm.

In FIG. 8B, the horizontal axis represents welding modes or conditions "A", "B" and "C", and the vertical axis represents the measured voltage. Under the welding condition "A" where the arc length is 0.3 mm, the voltage is in a range of 10.2 to 10.8 V. Similarly, under the welding condition "B" where the arc length is 1.0 mm, the voltage is in a range of 10.0 to 10.6 V. Under the welding condition "C" where the arc length is 0.3 mm, the voltage is in a range of 10.2 to 10.8 V. Although there is a little variation, the measured voltage is nearly constant even through the arc length varies from 0.3 to 1.0 mm. It may be safely said that the proportional relationship between the arc length and the voltage is not established.

Figure 9A:
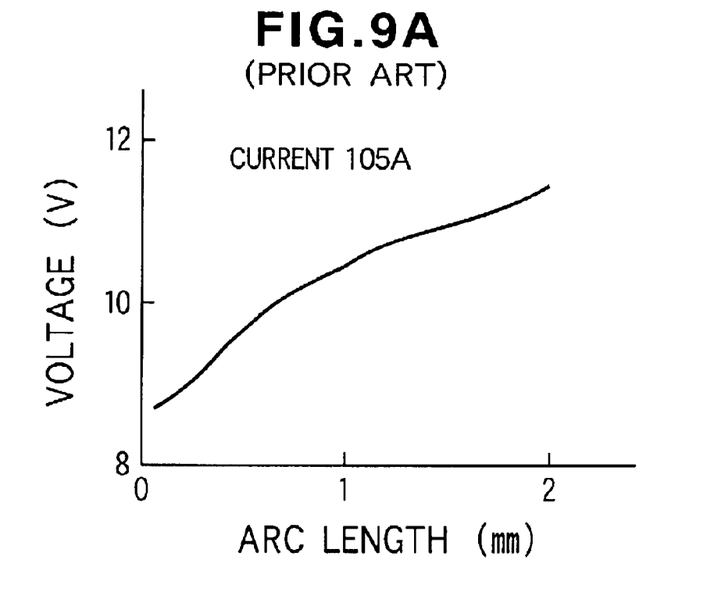
FIGS. 9A and 9B are graphs each showing a mutual relationship between the arc length and the voltage obtained conventionally from an experiment using a continuous arc.
Figure 9B:
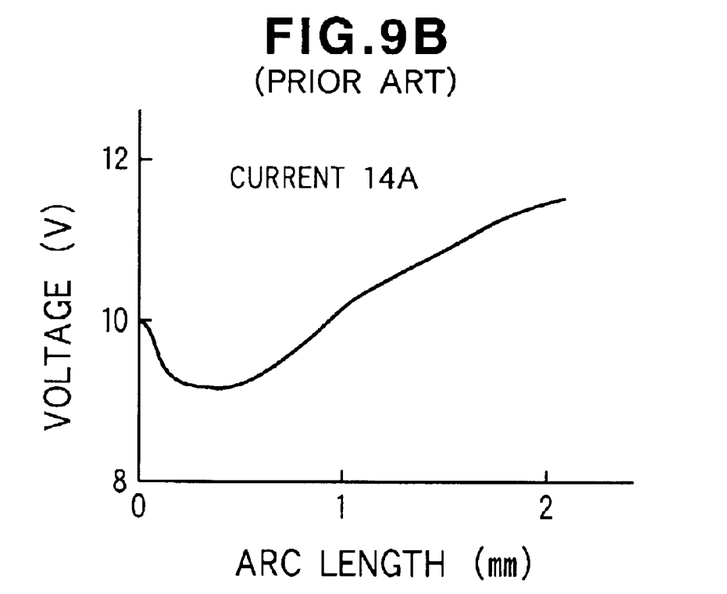

FIGS. 9A and 9B are graphs showing correlations between the arc length and the voltage that were obtained through an experiment using continuous arcs. In the experiment, welding of a copper plate was performed using a continuous arc produced by a TIG arc welding machine having a 1.6-mm-diameter tungsten electrode.

FIG. 9A shows the experimental result obtained when the continuous arc welding was achieved at a current of 105 A. In this figure, the horizontal axis represents the arc length and the vertical axis represents the voltage. It can be seen from FIG. 9A that the arc length and the voltage are proportional to each other and they substantially assume a linear function.

FIG. 9B shows the experimental result obtained from the continuous arc welding achieved at a current of 14 A. As seen from this figure, the arc length and the voltage are proportional to each other as long as the arc length indicated by the horizontal axis is not less than 1.0 mm. When the arc length is below 0.5 mm, the voltage shows an increase. As a consequence, there is no proportional relationship established between the arc length and the voltage when the arc length is less than 1.0 mm. This confirmed that the arc voltage control is not suitable for a continuous arc welding process using a small current.

The present inventors have reached a view that the known proportional relationship between the arc length and the voltage can be used when the welding is achieved with a relatively long arc length (larger than 1.0 mm and in a range of 2.0 mm to 5.0 mm) and at a relatively high current value (larger than 100 A), but the same relationship cannot apply when the arc length is less than 1.0 mm.

On the other hand, from the energy saving and environmental preservation point of view, very thin sheet metals have found an increased use in the manufacture of vehicle bodies and exhaust systems. For the manufacture of such vehicle bodies and exhaust systems, a welding process that can be achieved at a relatively small current not much exceeding 20 A and with an arc length of about 0.5 mm have become absolutely necessary.

DISCLOSUREE OF THE INVENTION

The present invention provides a novel welding technique which can realize welding of very thin sheet metals that cannot be achieved by the conventional arc voltage control.

In groping a weld control technique replacing the conventional arc length control and arc voltage control, the present inventors found a fact that the arc light changes nicely as the distance between the electrode and the base metal varies.

According to a first invention, there is provided a control method for an arc welding process, comprising the steps of: (a) obtaining optical information from light produced from an electric arc during an arc welding process; (b) comparing the obtained optical information with reference information; (c) adjusting welding conditions on the basis of a result of comparison made between the obtained optical information and the reference information; (d) carrying out the arc welding process under the adjusted welding conditions; and (e) repeating the preceding processes (a) to (d) in the order named to thereby perform the arc welding process.

The control method of the first invention replaces the conventional constant voltage control or constant torch height control by a position control of an electrode or a torch that is performed while adjusting welding conditions on the basis of optical information obtained from the light of an electric arc produced during an arc welding process. The optical information, such as illuminance (also known as illumination or luminous flux density), obtained from the arc light has a good mutual relationship with the arch length or the torch height. Based on the illuminance or the like optical information, the weld control is achieved with high accuracy and reliability.

The arc welding process is a non-consumable electrode arc welding process. When used in such a non-consumable electrode arc welding process which is typified by the TIG (tungsten inert-gas) arc welding, the present invention can effectively perform welding of very thin sheet metals at low current and low voltage because a good mutual relationship established between the illuminance and the arc length has been confirmed even when the arc length is 0.25 mm. This enables a low heat exertion welding process, which can sufficiently suppress distortion of the base metal.

The optical information comprises illuminance of the arc light. The optical information may include illuminance of the arc light (illuminance at all spectrums), a variation of illuminance, spectral distribution, spectral intensity and so on. Among others, the illuminance can be easily measured by an illuminance meter, which is readily available, so that by reducing the invention method into practice, a substantial cost increase can be suppressed.

According to a second invention, there is provided an arc welding apparatus comprising: a welding machine that produces an electric arc across an electrode and a base metal; an optical sensor that obtains optical information from light produced from the electric arc during an arc welding process; and a processing unit that adjusts welding conditions according to the obtained optical information.

As described above, the optical information, such as illuminance, obtained from the arc light has a good correlation with the arc length or the torch height. Thus, the weld control is carried out on the basis of the optical information such as illuminance. The apparatus used for achieving the weld control merely requires an optical sensor and a processing unit that are provided in addition to an existing welding machine. Accordingly, undue increase in the equipment cost can be suppressed.

The arc welding process achieved by the arc welding machine is a non-consumable electrode arc welding process. When the present invention is embodied in such a non-consumable electrode arc welding process typified by the TIG welding, it is possible to realize welding of very thin sheet metals at low current and low voltage because a good mutual relationship established between the illuminance and the arc length has been confirmed even when the arc length is 0.25 mm. This ensures that high quality welded parts can be obtained.

It is preferable that the arc welding apparatus uses optical information comprised of illuminance of the arc light because an inexpensive and readily available illuminance meter can be used. Incorporating such illuminance meter into the arc welding apparatus does not greatly increase the equipment cost.

BEST MODE FOR CARRYING OUT THE INVENTION

Certain preferred embodiments of the present invention will be described below with reference to the accompanying sheets of drawings.

Figure 1A:
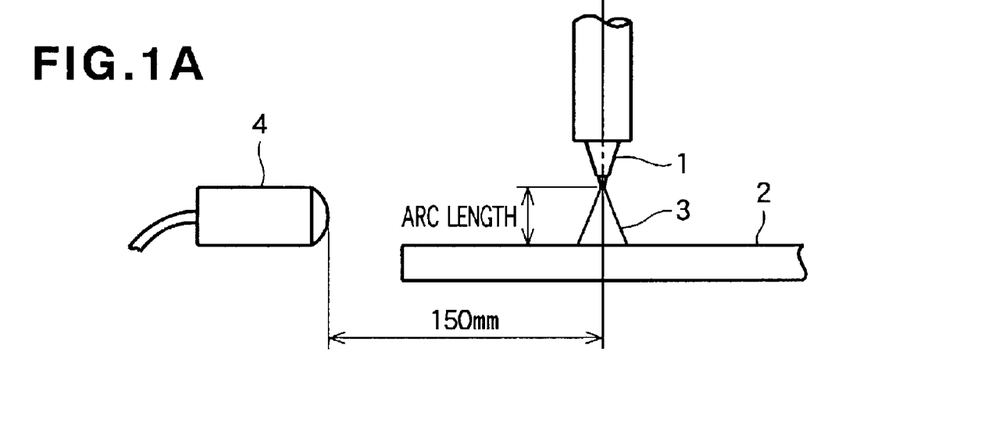
FIG. 1A is a view showing a TIG arc welding apparatus used in an experiment.

Using a TIG arc welding experimental apparatus which, as shown in FIG. 1A, is arranged to measure an electric arc 3 formed across an electrode 1 and a base metal 2 by means of an illuminance meter 4, the present inventors investigated the mutual relationship or correlation between the arc length and the illuminance.

The experiment was made under the conditions, as enumerated below.

Base Metal: stainless steel plate (JIS SUS 316L)
Kind of Electrode: tungsten
Electrode Diameter: 1.6 mm
Electrode Extension: 6.0 mm
Electrode Tip Angle: 30°
Electrode to Illuminance Meter Distance: 150 mm
Welding Machine: TIG arc welding machine
Welding Current: 40 A (FIG. 1B) and 81.25 A (FIG. 1C)

Figure 1B:
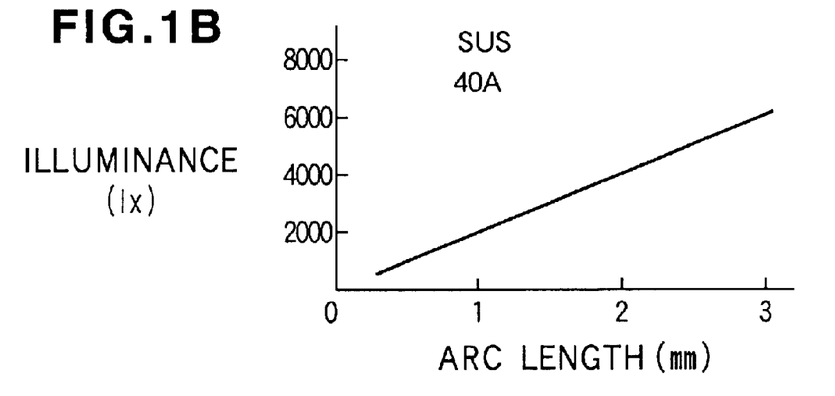
FIGS. 1B and 1C are graphs each showing a mutual relationship obtained from the experiment.

FIG. 1B graphically shows a relationship between the arc length and the illuminance obtained when a TIG arc welding process was performed with a welding current set at 40 A. As is clearly shown in this figure, the relationship between the arc length and the illuminance is represented by a linear function having a positive gradient or slope. This is because the illuminance take values of 731, 2125 and 6289 lux, respectively, when the arc length is 0.25, 1.0 and 3.0 mm.

Figure 1C:
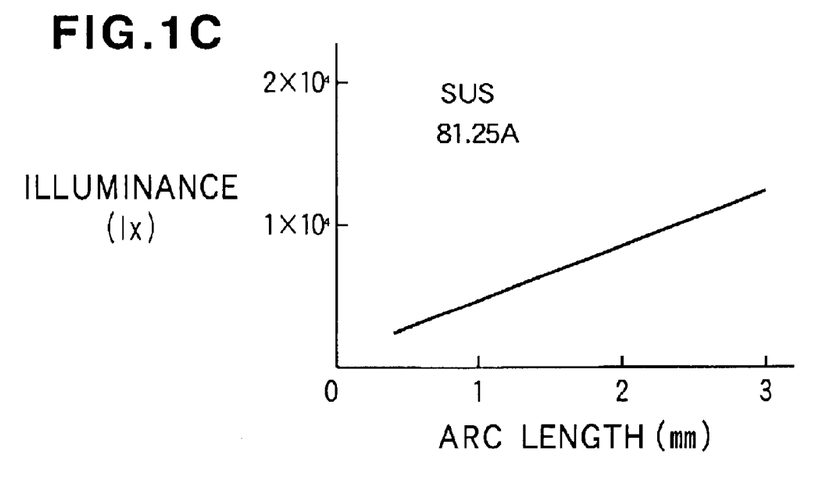

FIG. 1C is a graph showing a relationship between the arc length and the illuminance obtained when a TIG arc welding process was performed at a welding current of 81.25 A. As is clear from this figure, the relationship between the arc length and the illuminance is also represented by a linear function having a positive gradient or slope. This is because the illuminance takes values of $0.2006 \times 10^4$, $0.46 \times 10^4$ and $1.2649 \times 10^4$ lux, respectively, when the arc length is 0.25, 1.0 and 3.0 mm.

It is evident from FIGS. 1B and 1C that in the case of the base metal made of SUS316L, the arc length can be controlled using the illuminance as a parameter on condition that the welding current is kept constant while maintaining the electrode to illuminance meter distance of 150 mm. A further investigation was made so as to determine whether or not this rule could be applied to other materials or other welding processes.

Figure 2:
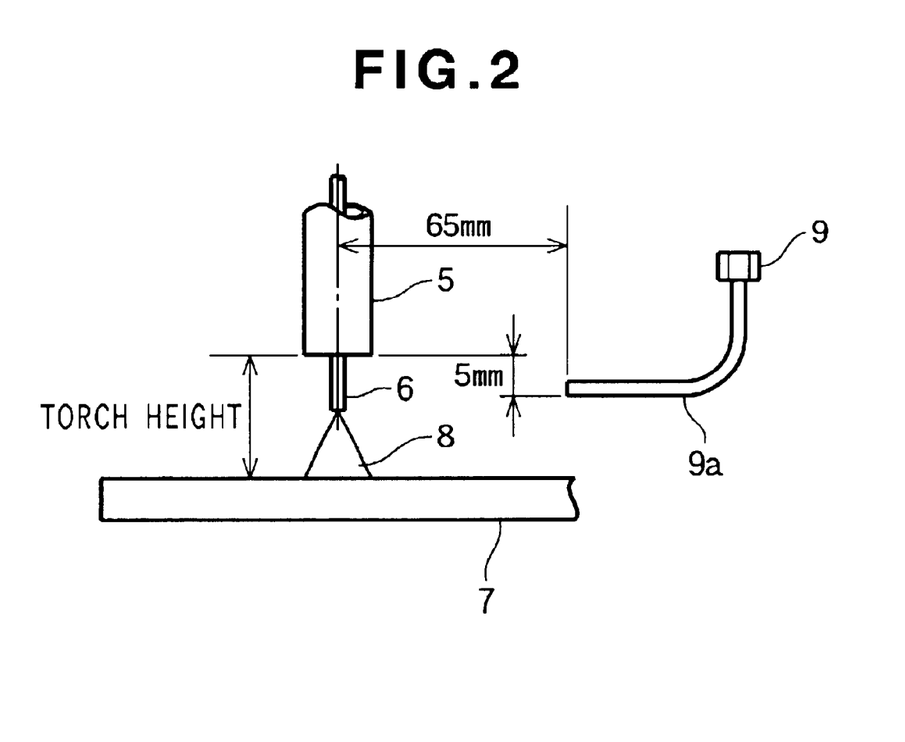
FIG. 2 is a view showing a MIG (metal inert-gas) welding apparatus used in an experiment.

FIG. 2 shows a MIG arc welding experimental apparatus used in an experiment made to determine the correlation between the distance from a base metal 7 to a torch 5 (i.e., torch height) and the illuminance (lux). The experimental apparatus includes an optical fiber 9a having one end thereof facing an electric arc 8 formed across a consumable electrode (wire) 6 passed through the torch 5 and the base metal 7, and an illuminance meter 9 connected to the opposite end of the optical fiber 9a for measuring illuminance of the arc light.

The experiment was made under the conditions, as enumerated below.

| | |
|---|---|
| Base Metal: | 6 mm thick aluminum plate or 12 mm thick stainless steel plate |
| Electrode Diameter: | 1.2 mm |
| Electrode to Illuminance Meter Distance: | 65 mm |
| Welding Machine: | MIG arc welding machine |
| Welding Current: | 200 A |
| Welding Voltage: | 25 V (for aluminum plate) or 28 V (for stainless steel plate) |
| Welding Speed: | 600 mm/min |

Figure 3A:
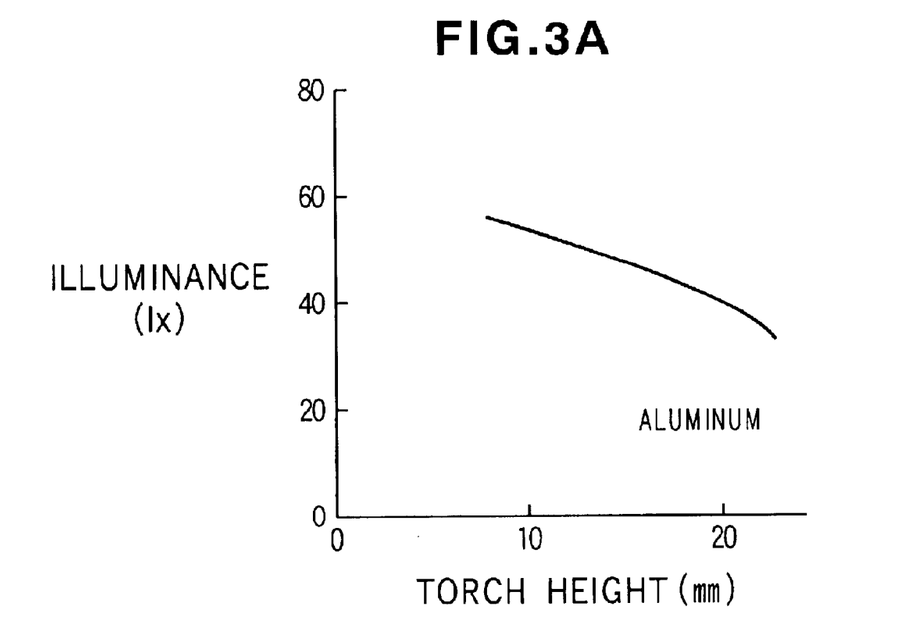
FIGS. 3A and 3B are graphs each showing a mutual relationship between the torch height and the illuminance obtained from the experiment using the MIG welding apparatus shown in FIG. 2.
Figure 3B:
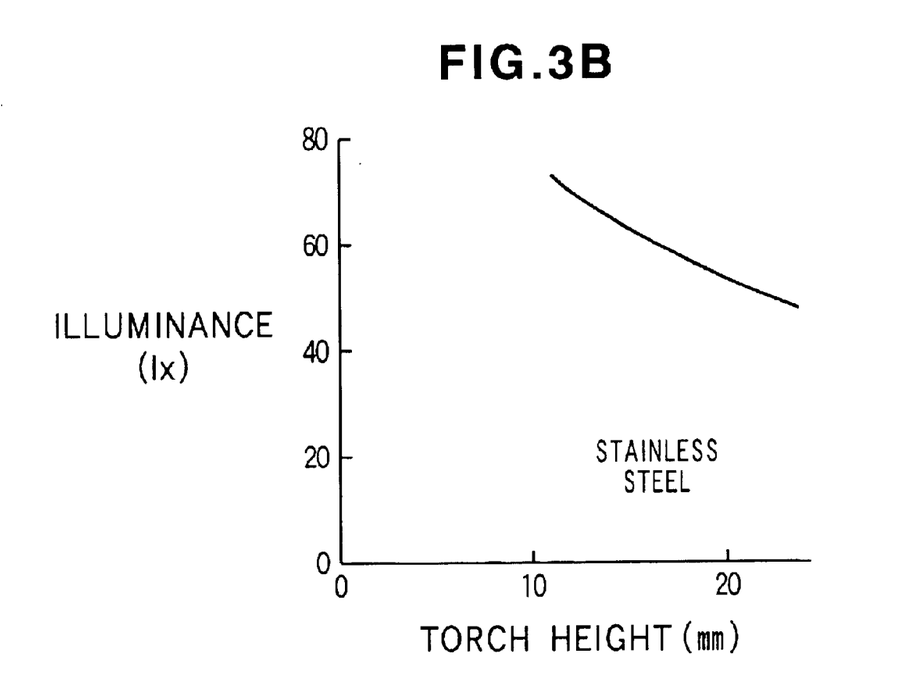

FIGS. 3A and 3B are graphs each showing a correlation between the torch height and the illuminance obtained using the MIG arc welding experimental apparatus when different base metals were used.

As shown in FIG. 3A, during a MIG arc welding process achieved for the aluminum plate, the illuminance takes values of 56.5, 41.5 and 34.9 lux, respectively, when the torch height is 7.5, 19 and 22.5 mm. From this, the correlation between the torch height and the illuminance can be represented by a linear function having a negative gradient or slope.

Similarly, as shown in FIG. 3B, during a MIG arc welding process achieved for the stainless steel plate, the illuminance takes values of 75, 58 and 52 lux, respectively, when the torch height is 10, 19 and 22.5 mm. From this, the correlation between the torch height and the illuminance can be also represented by a linear function having a negative gradient or slope.

It is apparent from FIGS. 1B, 1C, 3A and 3B that in the TIG arc welding process, the arc length and the illuminance have a good mutual relationship or correlation, and in the MIG arc welding, the torch height and the illuminance have a good mutual relationship or correlation. These correlations are determined depending on the kind of base metal. Accordingly, if "reference information" such as a reference illuminance or a reference voltage corresponding thereto is determined in advance through a fundamental experiment made for each set of welding conditions including the kind of base metal, type of welding, welding current and electrode configuration, it becomes possible to maintain the arch length or the torch height at a desired value. Based on the experimental data, the present inventors have proposed a novel control method for arc welding process and an apparatus for carrying out the control method. Certain embodiments of the invention will be described below with reference to FIGS. 4 to 7.

Figure 4:
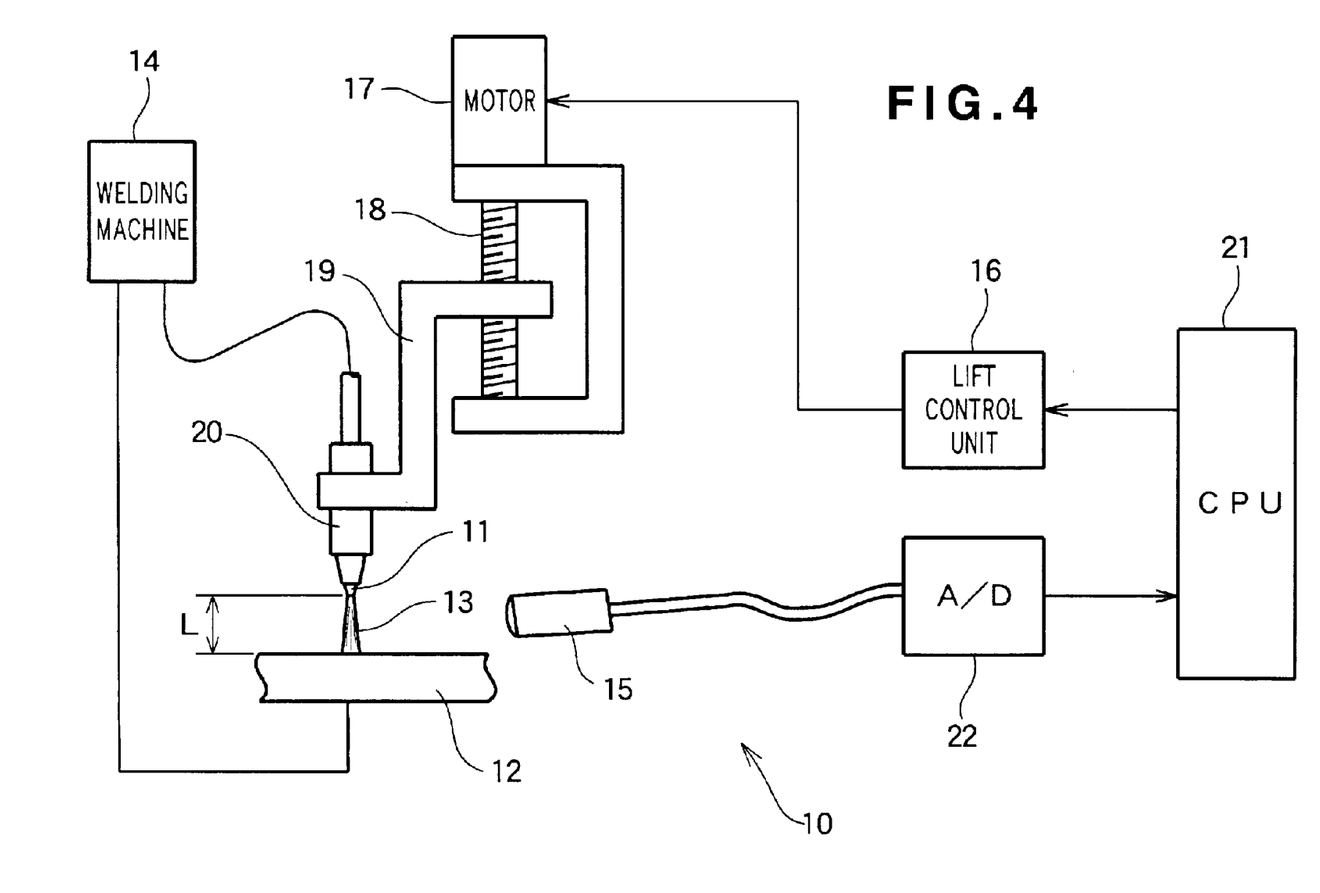
FIG. 4 is a schematic view showing an arc welding apparatus according to the present invention.

FIG. 4 is a view showing the principle of an arc welding apparatus according to the present invention. The arc welding apparatus 10 comprises a welding machine 14 that produces an electric arc 13 across an electrode 11 and a base metal 12, an optical sensor 15 that obtains optical information from light produced from the electric arc during an arc welding process, and a central processing unit (CPU) 21 that, on the basis of the obtained optical information, adjusts welding conditions to thereby vary the length of the arc 13 (arc length L) by lifting a torch holder 19 and a torch 20 up and down via a lift control unit 16, a lift motor 17 and a screw 18.

Reference numeral 22 denotes an analog-to-digital (A/D) converter, which is provided only when conversion of an analog signal to a digital signal is necessary.

The optical information may include illuminance of the arc light (illuminance at all spectrums), variations of illuminance, spectral distribution, spectral intensity and so on. The following description deals only with the illuminance of the arc light.

Operation of the arc welding apparatus of the foregoing construction will be described with reference to FIGS. 4 and 5.

Figure 5:
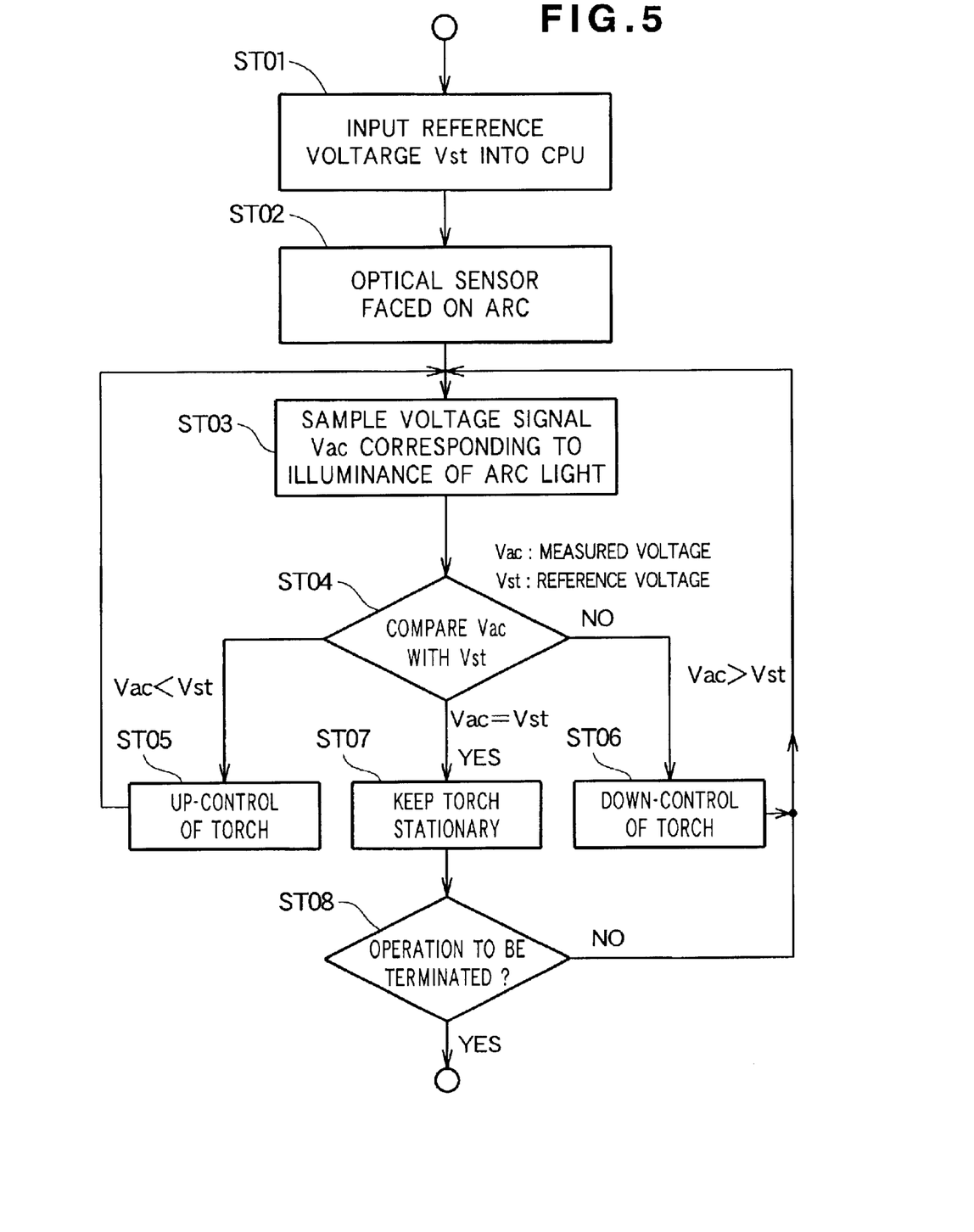
FIG. 5 is a flowchart showing one example of the control of an arc welding process according to the present invention.

FIG. 5 is a flowchart showing an arc welding control procedure according to the present invention.

Step (hereinafter abbreviated "ST") 01: A reference voltage Vst is inputted in the CPU 21. As previously described with reference to FIGS. 1 to 3, the illuminance of the arc light has a good mutual relationship with the arc length or the torch height. The mutual relationship or correlation is determined in advance through an experiment made for each set of welding conditions including the type of welding, welding current and material of the base metal. The correlation thus determined is converted into a voltage signal, and at that time the reference voltage is stored in advance in the CPU.

ST02: The optical sensor 15 shown in FIG. 4 is faced on the arc 13.

ST03: The optical sensor 15 picks up a voltage signal Vac corresponding to the detected illuminance of arc light.

ST04: The measured voltage signal Vac is compared with the reference voltage Vst, and if Vac<Vst, the control procedure goes onto ST05. Alternatively, if Vac>Vst, the control procedure goes on to ST06, and if Vac=Vst, the control procedure advances to ST07.

ST05: If Vac<Vst, the torch is moved upward (provided that the base metal 12 is made of stainless steel or aluminum). As shown in FIG. 1B, the illuminance increases with an increase in the arc length. Thus, with an upward movement of the torch, the Vac rises gradually and approaches the Vst. Then, the control procedure goes back to ST03 where the effect of the upward movement of the torch is investigated.

ST06: If Vac>Vst, the torch is moved downward (provided that the base metal 12 is made of stainless steel or aluminum). As also shown in FIG. 1B, the illuminance decreases with a decrease in the arc length. Thus, with a downward movement of the torch, the Vac drops gradually and approaches the Vst. The control procedure then goes back to ST03 for subsequent investigation of the effect of downward movement of the torch.

ST07: If Vac=Vst, this means that the arc length or the torch height is adequate. Thus, the torch is held at that position.

ST08: A judgment is formed so as to determine whether or not the welding process is to be terminated. Stated more concretely, when a signal to interrupt, stop or terminate the welding process has been received, the judgment result is YES and the control procedure comes to an end. In the absence of such signal, the judgment formed at ST08 is NO, and the control procedure returns to ST03 and further continues the welding process while repeating the steps subsequent to ST03.

Figure 6:
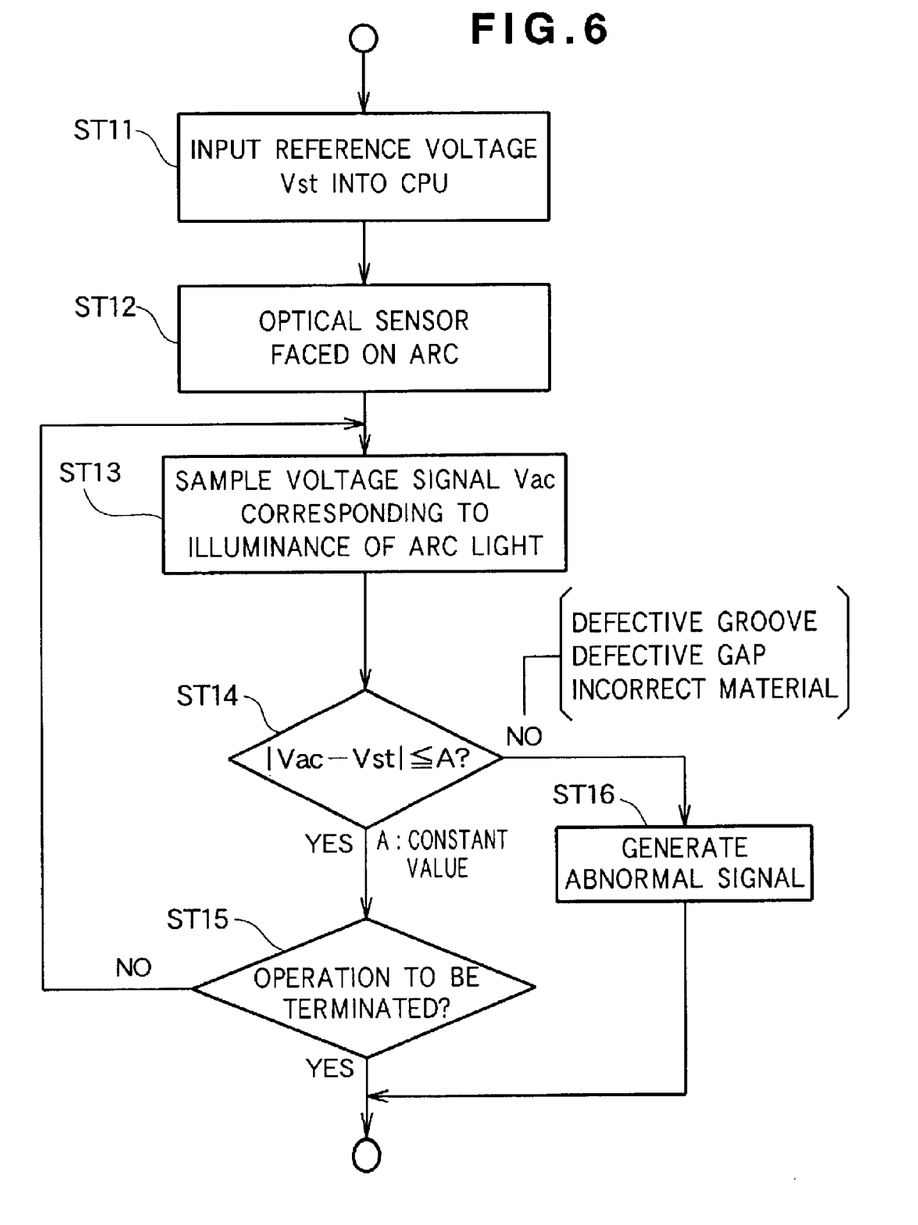
FIG. 6 is a flowchart showing another example of the control of the arc welding process.

FIG. 6 is a flowchart showing a different arc welding control procedure according to the present invention.

ST11: A reference voltage Vst is inputted in the CPU in the same manner as ST01 described previously.

ST12: The optical sensor 15 is faced on the arc 13 in the same manner as ST02 described above.

ST13: By the optical sensor 15 a voltage signal Vac corresponding to the detected illuminance of arc light is picked up or sampled in the same manner as ST03 described previously.

ST14: The difference between the measured voltage Vac and the reference voltage Vst is checked up and a judgment is then formed to determine whether the difference Vac−Vst is less than or equal to a predetermined constant value "A". The constant value "A" represents an allowable difference between Vac and Vst that is unavoidably involved in a usual welding process. This value is determined in advance through a repeated experiment. If Vac−Vst ≦A, this means that the voltage difference is in normal, and the control procedure advances to ST15. Alternatively, if Vac−Vst >A, the control procedure goes on to ST16.

ST15: A judgment is formed so as to determine whether or not the welding process is to be terminated. Stated more specifically, when a signal to interrupt, stop or terminate the welding process has been received, the judgment result is YES and the control procedure is completed. In the absence of such signal, the judgment formed at this step is NO, and the control procedure returns to ST13 and further continues the welding process while repeating the steps subsequent to ST13.

ST16: If Vac−Vst>A, this means that weld abnormalities or incorrect material may occur. Thus, an abnormal signal is generated to urge an appropriate countermeasure and terminate the control procedure, thereby interrupting or terminating the welding process.

Then, the possibility of occurring weld abnormalities or an incorrect material will be discussed below in detail.

In a butt welding process, a single bevel groove, V-shaped groove or U-shaped groove is formed and filled with weld metal. If such groove is formed with local irregularities, a defect may occur in the form of an insufficient deposition of weld metal or an excessive deposition of weld metal. In a manual welding process, such a defect-inducing groove (defective groove) can be found or detected through human eyes of the welding operator. In an automated welding process, however, detection of such defective groove requires a CCD camera and an image analyzer that are provided separately. In this point, according to the present invention, when the electrode reaches a position where the groove deviates from a predetermined configuration, a steep change will occur in the illuminance, spectral intensity or spectral distribution. The steep change in the illuminance, for example, may be considered to indicate the occurrence of a defective groove.

Furthermore, in the butt welding process, two pieces of base metal are placed end to end while keeping a predetermined gap or space therebetween, and the ends of the base metal pieces are joined together by welding. In this instance, if one piece of base metal is offset from the other, it may occur that the gap becomes into an inverted V shape when viewed from the electrode or torch. If the welding process continues while keeping this condition, welding becomes insufficient due to penetration of the arc or drop of the weld metal occurring at a position where the gap is excessively large. Alternatively, at a position where the gap is excessively small, welding also becomes insufficient due to insufficient melting or fusing of the base metal. The defective gap resulting in such welding failure can be found or detected through human eyes of the operator when the welding is achieved manually. In an automated welding process, however, a CCD camera and an image analyzer must be provided separately. In this point, according to the present invention, when the electrode reaches a position where the gap is deviate in size from a predetermined value, a steep change will occur in the illuminance, spectral intensity or spectral distribution. The steep change in the illuminance, for example, may be considered to indicate the occurrence of a defective gap (defective groove). An example of such defective groove will be discussed below in detail.

Figure 7:
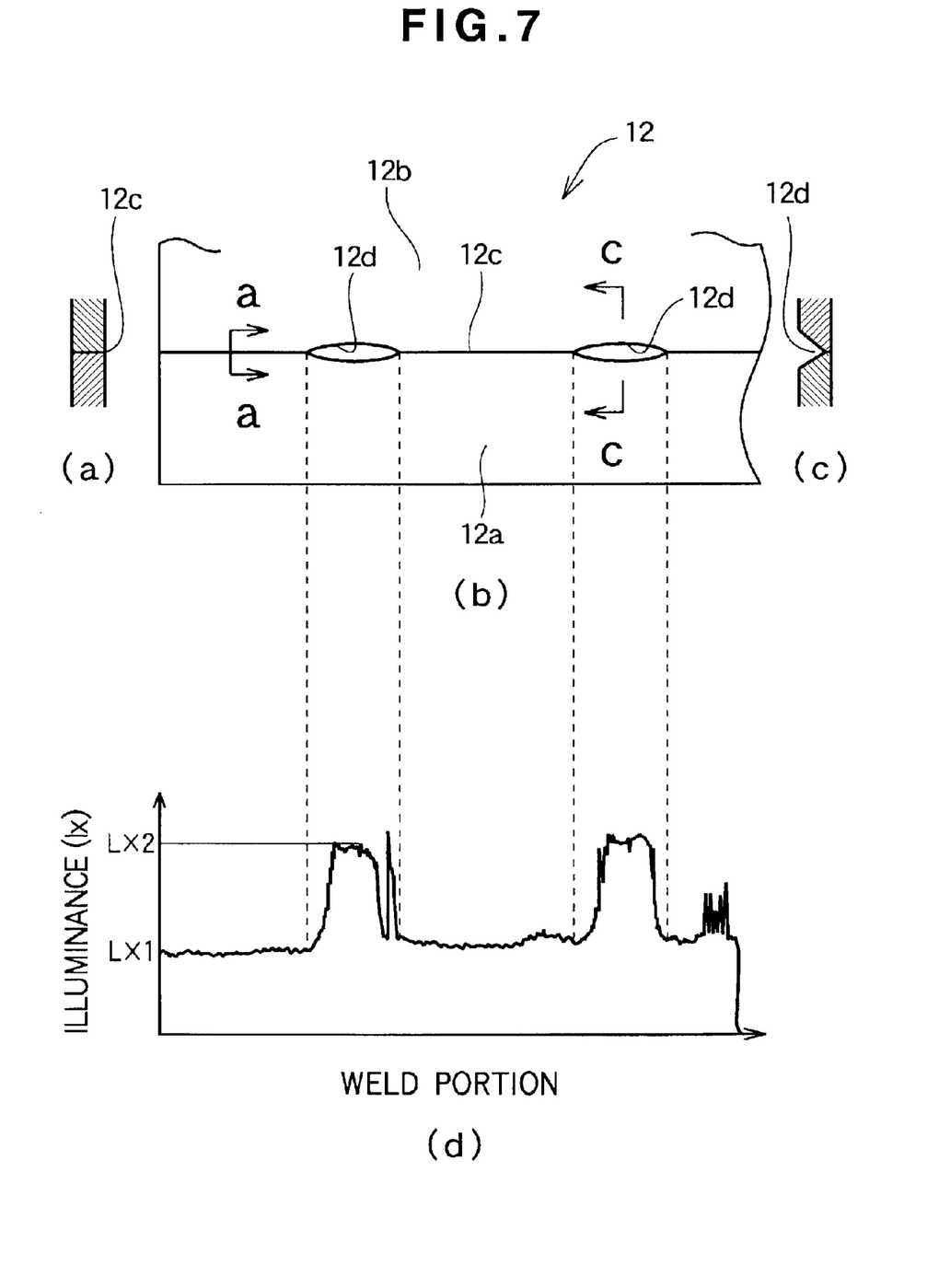
FIG. 7 is a graph showing the relationship between the illuminance of arc light and the defective groove.

(a) to (d) of FIG. 7 are graphs showing the relation between the illuminance of arc light and the defective groove.

(b) of FIG. 7 is a plan view of a main portion of two pieces of base metal 12. The first base metal piece 12a is held in abutment with the second base metal piece 12b, with defective groove portions 12d, 12d being formed, for experiment, at an abutting or mating portion 12c between the base metal pieces 12a and 12b.

(c) of FIG. 7 is a cross-sectional view taken along line c—c of (b), showing a cross section of the defective groove portion 12d. The defective groove portion 12d is formed by a V-shaped groove having a depth which is 75% of the thickness of the base metal pieces 12a, 12b.

(a) of FIG. 7 is a cross-sectional view taken along line a—a of (b), showing a normal or non-defective abutting portion 12c.

An apparatus used in the experiment was similar to the apparatus shown in FIG. 4, but a light shield cover was added to shield the illuminance meter from outside light. Other experimental conditions are as follows.

Welding conditions:

| | |
|---|---|
| Base Metal: | 1 mm thick stainless steel plate (SUS 316) |
| Kind of Electrode: | tungsten |
| Electrode Diameter: | 1.6 mm |
| Electrode Tip Angle: | 60° |
| Electrode to Illuminance Meter Distance: | 300 mm |
| Welding Machine: | TIG arc welding machine |
| Welding Current: | 70 A (peak current), 4 A (base current) |

Data obtained by the experiment is graphically shown in (d) of FIG. 7.

In (d), the vertical axis represents the illuminance of arc light and the horizontal axis represents the welded portion. The illuminance has two measured values: a first value LX1 and a second value LX2 which is much larger than the first value LX1: As seen from FIG. 7, vertical lines drawn downward from the defective groove portions 12d shown in (b) well match in position to the welded portions having the illuminance values LX2. From this, it is confirmed that the defective groove can be detected with high accuracy in the form of a change in the illumination.

The material of the base metal is, in many cases, difficult to discriminate visually. Accordingly, checking of the material of the base metal is not practically effected in the welding process. According to the present invention, however, since a reference voltage peculiar to each material is previously inputted in the CPU, a measured voltage deviating greatly from a selected reference value may provably indicate that the base metal is made of a material other than specified. Thus, an incorrect material can be detected.

The present invention dexterously utilizes "optical information from the arc light", so that the invention can be applied to both the non-consumable electrode arc welding process (TIG arc welding, atomic-hydrogen arc welding and carbon arc welding) and the consumable electrode arc welding process (MIG arc welding, carbon oxide gas arc welding, electrogas arc welding, shielded arc welding and metal arc welding) so long as the arc light stands exposed during the welding process.

Among others, TIG arc welding, which is a typical of the non-consumable electrode arc welding process, can perform accurate welding of very thin sheet metals because a good mutual relationship between the illuminance and the arc length is established over the arc lengths ranging from 0.25 to 3.0 mm.

The optical information may include various items of information or factors. Among others, the quantity of light and the illuminance can be easily measured by using a light-quantity meter and an illuminance meter, respectively, both of which are inexpensive and readily available. Accordingly, from the utility and economical point of view, it is reasonable to use the quantity of light or the illuminance as a weld control factor.

The foregoing description of the arc welding apparatus shown in FIG. 4 has been focused on the lift mechanism for the holder 19. However, the holder 19 may be attached to a robot arm for enabling three-dimensional positioning. In effect, the arc welding apparatus may be composed of a well-known automated welding apparatus or a semi-automatic welding apparatus, which is equipped with an optical sensor and a processing unit for processing optical information obtained from the optical sensor.

What is claimed is:

1. A control method for an arc welding process, comprising the steps of:

(a) obtaining optical information from light produced from an electric arc during an arc welding process;

(b) determining whether or not a difference between the obtained information and reference information is within a predetermined range of deviation from the reference information that is determined in advance to detect the occurrence of a weld abnormality; and (c) when the result of determination shows that the difference is within the predetermined range of deviation, continuing the arc welding process while repeating the preceding steps (a) and (b) until an instruction to terminate the arc welding process is received, or alternatively when the result of determination shows that the difference is outside the predetermined range of deviation, interrupting the arc welding process.

2. The control method for the arc welding process according to claim 1, wherein the optical information comprises illuminance of light from the electric arc, and the weld informality comprises a defective groove, a defective gap or an incorrect material that is involved in two pieces of base metal to be welded together.

3. The control method for the arc welding process according to claim 1, wherein the step of interrupting the arc welding process comprises generating an abnormal signal to urge an appropriate countermeasure against a weld abnormality occurred.

4. An arc welding apparatus comprising:

a welding machine that produces an electric arc across an electrode and a base metal;

an optical sensor that obtains optical information from light produced from the electric arc during an arc welding process; and a control unit operatively connected with the welding machine and the optical sensor for controlling operation of the welding machine based on the optical information obtained by the optical sensor, the control unit having a function of storing reference information and a predetermined range of deviation from the reference information that is determined in advance to detect the occurrence of a weld abnormality, a function of determining whether or not a difference between the obtained information and the stored reference information is within the stored predetermined range of deviation, and when the result of determination shows that the difference is within the stored predetermined range of deviation, a function of continuing operation of welding machine, and when the result of determination shows that the difference is outside the stored predetermined range of deviation, a function of interrupting operation of the welding machine.

5. The arc welding apparatus according to claim 4, wherein the optical information comprises illuminance of the light from the electric arc, and the weld informality comprises a defective groove, a defective gap or an incorrect material that is involved in two pieces of base metal to be welding together.

6. The arc welding apparatus according to claim 4, wherein the control unit further has a function of generating an abnormal signal to urge an appropriate countermeasure against a weld abnormality occurred.

* * * * *